United States Patent [19]
Dransfield

[11] 3,810,524
[45] May 14, 1974

[54] APPARATUS FOR CARRYING A SEISMIC ENERGY GENERATOR

[75] Inventor: Clifford D. Dransfield, Dallas, Tex.

[73] Assignee: Atlantic Richfield Company, New York, N.Y.

[22] Filed: Nov. 15, 1972

[21] Appl. No.: 306,895

[52] U.S. Cl............................ 181/.5 H, 181/.5 VM
[51] Int. Cl.............................................. G01v 1/14
[58] Field of Search............ 181/.5 VM, .5 XC, .5 H

[56] References Cited
UNITED STATES PATENTS
| | | | |
|---|---|---|---|
| 3,474,880 | 10/1969 | Gundlach | 181/.5 VM |
| 3,277,977 | 10/1966 | Silverman | 181/.5 VM |
| R26,825 | 3/1970 | Kenney | 181/.5 VM |

*Primary Examiner*—Samuel Feinberg
*Assistant Examiner*—J. V. Doramus

[57] ABSTRACT

Apparatus for carrying a seismic energy generator includes a frame and a carriage movable with respect to each other interconnected by a unidirectional dashpot which allows the carriage upon which the generator is mounted to move freely upwardly and constrains it from moving rapidly downwardly. The dashpot, in one embodiment, includes a piston, with holes therethrough contained within a hydraulic cylinder and a plate mounted adjacent and spring biased away from the piston to cover the holes when the bias is overcome by hydraulic fluid pressure to restrict the fluid flow and movement of the carriage in one direction.

The dashpot, in an alternative form, includes a plurality of mechanical engaging assemblies for connecting in a selected rotational direction disc brakes to respective sprocket gears, which, in turn, engage chains to thereby interconnect the carriage and frame. The brakes are thus operative to allow the generator to move freely upwardly and to constrain it from moving rapidly downwardly, or vice versa.

13 Claims, 6 Drawing Figures

APPARATUS FOR CARRYING A SEISMIC ENERGY GENERATOR

BACKGROUND OF THE INVENTION

1. Field of the invention

This invention relates to seismic exploration equipment, and more particularly to apparatuses for carrying seismic energy generators or the like.

2. Description of the prior art

Becoming of increased interest in replacing widely-used dynamite charge techniques in seismic exploration are seismic energy generators utilizing a gas explosion within a closed, expandable combustion chamber. A cylindrical plate comprising part of the combustion chamber is disposed on a surface of the ground to impact upon combustion thereupon to generate the desired seismic signal.

In such generators, however, it has been found that after the charge has been ignited and the ground impacted, the generator bounces from the impact point. To prevent the generator from subsequently reimpacting the ground, which may generate interfering seismic signals, "catching" apparatuses have been proposed. One such "catcher" proposed, for example, includes a frame mounted onto a truck and from which the generator is suspended by a hydraulic cylinder. A hydraulic fluid pipe network is provided to conduct hydraulic fluid within the cylinder below the piston to a reservoir or accumulator through a unidirectional check valve in parallel with an adjustable orifice and solenoid valve. As the generator moves upwardly, the fluid flows from the accumulator through the check valve to the hydraulic cylinder below the piston. As the generator moves down, the fluid flows through the adjustable orifice and solenoid valve to be thereby restricted from flowing rapidly back into the accumulator to retard the downward movement of the generator.

Recently, applicant herein and Phillip Wise, in co-pending patent application Ser. No. 286,739, filed Sept. 6, 1972, have advanced a seismic energy generator having an elongated combustion chamber which can be suspended above the surface to which seismic energy is to be imparted, for example, a distance approximately three times the diameter of the generator. Thus, to accommodate such generator, the design of a "catcher" apparatus should take into consideration the relatively large distance over which the apparatus may travel.

In any event, it is desirable that the apparatus "catch" the seismic energy generator after it first bounces or otherwise is thrust upwardly from the point of impact, to prevent secondary or subsequent impacts. Furthermore, single gas exploding seismic energy generators are commonly repeatedly fired upon the same location. Consequently, the catcher used desirably temporarily constrains the subsequent downward movements, but, within a controllable time, ultimately allows the return of the generator to its initial or predetonated position to be ready for subsequent detonations and impacts.

Most gas combustion seismic energy generators heretofore proposed are of relatively heavy construction, the large parts being of iron, steel or the like, and they generate a considerable amount of energy. The catchers used heretofore, consequently, have necessarily been of considerable size and weight, not uncommonly of weight at least equal to the weight of the seismic energy generator itself. The total resulting large weight is a significant factor in the design of vehicles and the like intended to transport the apparatuses from place to place. The generators and their catchers frequently, in fact, are mounted in pairs off opposite sides of a truck bed to balance the load they present on the vehicle.

It has been also proposed to mount the generators on portable frames and transported from place to place by helicopter. The weight, again, of the generators and frames has become of interest.

SUMMARY OF THE INVENTION

In light of the above, it is, therefore, an object of the invention to present apparatus for carrying a seismic energy generator or the like.

It is another object of the invention to provide apparatus for carrying a gas combustion seismic energy generator, allowing it to bounce away from the impacted surface, but constraining it from reimpacting the surface.

It is another object of the invention to present a catcher for a seismic energy generator.

It is another object of the invention to provide a catcher using a unidirectional hydraulic dashpot.

It is another object of the invention to present a unidirectional hydraulic dashpot.

It is another object of the invention to provide a catcher using a mechanical unidirectional dashpot.

It is a further object of the invention to present a unidirectional mechanical dashpot.

It is a further object of the invention to provide an apparatus for holding, positioning, and catching, after firing, a seismic energy generator which allows free upward movement and which resists downward movement.

It is a further object of the invention to present an apparatus for holding, positioning, and catching, after firing, a seismic energy generator which is compact and lightweight for ease and convenience in handling.

It is still a further object of the invention to provide apparatus for holding, positioning, and catching, after firing, a seismic energy generator which may be used as a self-contained unit or in conjunction with a vehicle.

These and other objects, features, and advantages will become apparent to those skilled in the art from the appended claims, accompanying drawing, and hereinafter set forth detailed description of the preferred embodiments.

In its broad aspect, the invention presents apparatus for carrying a seismic energy generator, including a generator holding frame and means for controlling movement between the frame and the generator. Means are also provided for affecting the resistance of the movement controlling means whereby it presents little resistance to upward movement and a larger resistance to downward movement of the generator.

The apparatus, in accordance with the invention, is lightweight and can be self-contained or conveniently mounted onto a truck or other vehicle to be easily transported from one place to another. The apparatus enables the generator to be carried upon or at a predetermined height above the ground to impact and impart seismic energy into the ground. After impact, the generator is free to bounce or move upwardly to thereafter be caught and constrained from subsequent rapid downward movement.

BRIEF DESCRIPTION OF THE DRAWING

The invention is illustrated in the accompanying drawing, wherein.

In the various figures of the drawing, the sizes and dimensions of various parts have been exaggerated or distorted for ease of description and clarity of illustration. In the various figures of the drawing, like reference numerals denote like parts.

DETAILED DESCRIPTION OF THE PREFERRED EMBODIMENTS

Figure 1:
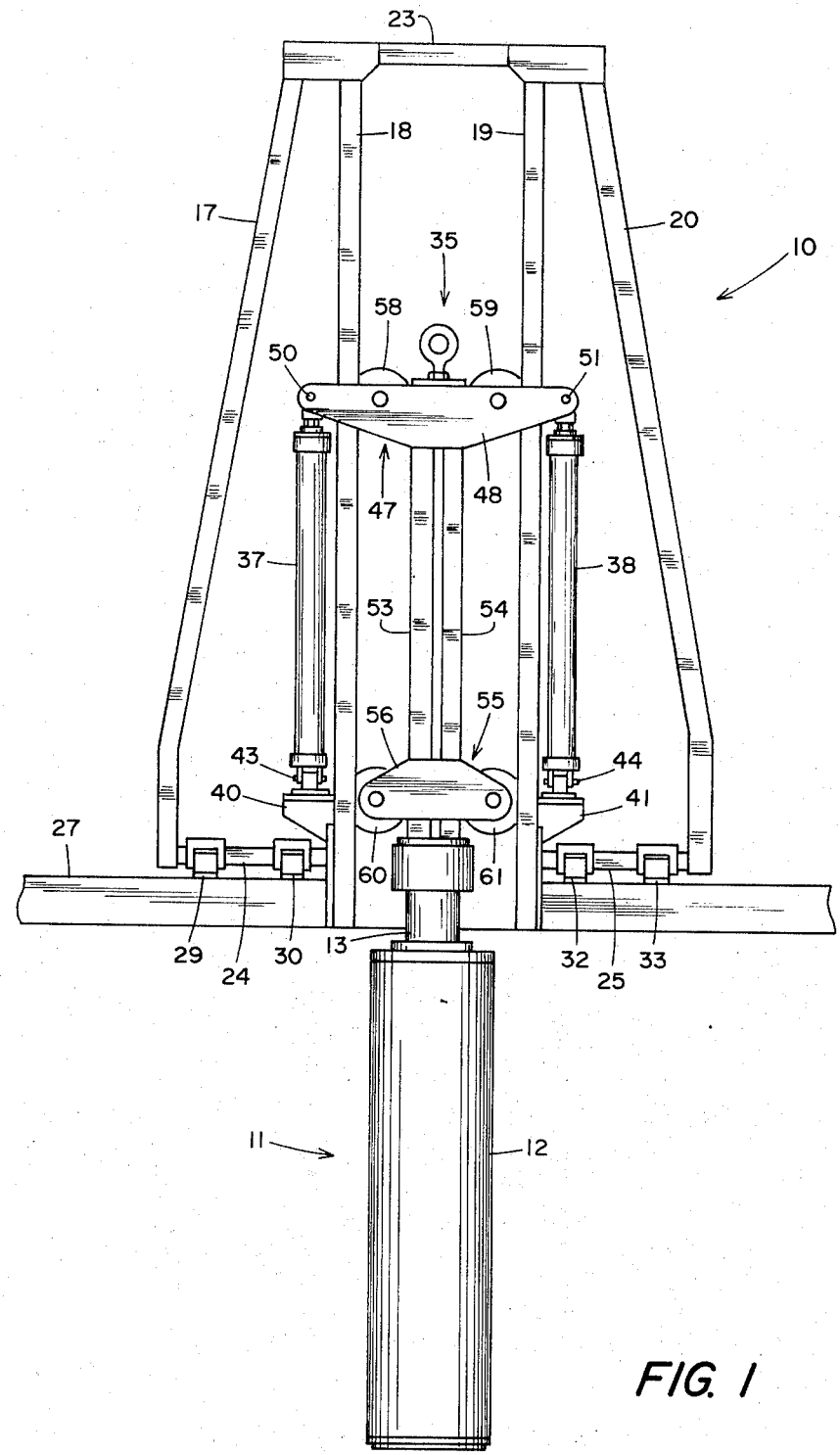
FIG. 1 is an elevational view of an apparatus in accordance with a preferred embodiment of the invention, used in combination with a seismic energy generator.

As shown in FIG. 1, the apparatus or catcher 10, in accordance with the invention, is particularly suitable to carry, hold, and position, and to constrain the movements of, an elongated seismic wave generator 11. Although such elongated generator can be such as, for example, a generator of the type described and illustrated in copending application Ser. No. 286,739, filed Sept. 6, 1972 by Clifford D. Dransfield, applicant herein, and Phillip W. Wise, entitled METHOD AND APPARATUS FOR GENERATING SEISMIC WAVES, incorporated herein by reference, the catcher 10 can be used to equal advantage, however, with seismic energy generators of other types, shapes and configurations.

The elongated generator 11, with reference to which the catcher 10 is hereinafter described, includes an elongated outer impacting mass 12 and a piston assembly 13. Briefly, in operation, a gas explosion takes place within the impacting mass 12 between the bottom and the piston assembly 13, causing the impacting mass to move downwardly and impact the ground 14 to generate seismic waves 15 beneath its surface. The piston assembly 13, in an opposite reaction, moves upwardly, subsequently followed by the bouncing impacting mass 12.

The catcher 10 includes a frame comprising braces 17, 18, 19, and 20, of an appropriate strong supporting material, such an channel iron or the like, interconnected at top by a cross-brace 23 of similar material. Braces 17 and 18 are connected at bottom by crossbrace 24 and, similarly, braces 19 and 20 are connected at bottom by brace 25, also of appropriate strong materials. The frame is carried on a platform 27, conveniently the bed of a truck, other vehicle, or the like (not shown), to facilitate movement of the generator 11 and catcher 10 from place to place. To further facilitate movement of the catcher 10, the bottom cross-braces 24 and 25 include hinges 29 and 30, and hinges 32 and 33, respectively, to enable the catcher 10 to be folded out of the way, if desired, onto the platform 27.

A carriage 35 is carried between the braces 18 and 19, and includes two hydraulic cylinders 37 and 38. The hydraulic cylinders 37 and 38 are rotatably attached at their bottom ends to braces 18 and 19 at outstanding ears 40 and 41 by pins 43 and 44, respectively, and at their top ends (by the hydraulic piston rods, illustrated) to a yoke 47, including a front brace 48 and a corresponding back brace, not shown, by pins 50 and 51, respectively. The particular orientation of the hydraulic cylinders 37 and 38 may, of course, be reversed, with the cylinder portions attached to the yoke 47 and the piston rod portions attached to the ears 40 and 41. The yoke 47 carries the generator 11 by extenders 53 and 54, to which a second yoke 55, including a front brace 56 and a corresponding back brace, not shown, is connected. The extenders 53 and 54 can be connected by bolts (not shown) or the like to the piston assembly 13 of the generator 11.

Rotatably carried by the yokes 47 and 55 are wheels 58–61 disposed to ride within the channel of channel iron braces 18 and 19, as shown, to prevent undesired lateral, rotational and other such undesired movements of the generator 11.

Figure 2:
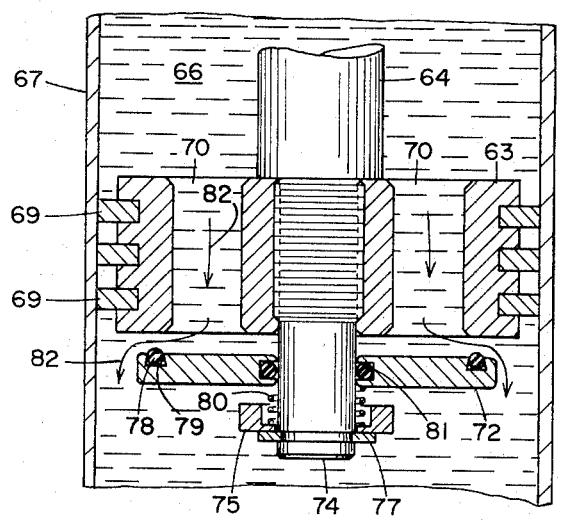
FIG. 2 is an elevational side view, in cross-section, of a portion of a hydraulic cylinder showing elements in combination with its piston for unidirectional dashpot operation, as used with respect to the apparatus of FIG. 1.

To enable the apparatus to present relatively little resistance to upward movement and a higher resistance to downward movement, the pistons of the hydraulic cylinders 37 and 38 are modified, as illustrated in FIG. 2. As shown, the piston 63 of the hydraulic cylinder is carried by a piston rod 64 in a fluid 66 contained within the hydraulic cylinder wall 67, and is isolated from the cylinder wall 67 by rings 69, or the like. A plurality of holes 70 are formed through the piston 63 through which the fluid 66 within the cylinder is free to flow. On one side of the piston 63 corresponding to the side of highest fluid pressure upon downward movement of the generator 11, such as the bottom side illustrated, a plate 72 is mounted onto a stud 74, which can be an extension of the piston rod 64, or a protruding shaft, welded, screwed, or otherwise affixed to the piston rod 64, or to the piston 63 itself. The plate 72 is retained in position on the stud 74 by a collar 75 cut to accept and accommodate a compressed spring 80, as shown, held in position by a locating spring washer or ring 77, or the like, and allowed to move or slide on the stud toward and away from the bottom face of the piston 63. The plate 72 is biased in the direction of the piston 63 by the spring 80, or the like, and is sealed to fluid flow in its position adjacent the face of the piston 63 by a sealing ring 78 disposed in a groove 79 around the top surface of the plate 72. The plate 72 can be further sealed, as shown, from fluid flow by a second seal ring 81 at its sliding engagement with the stud 74.

Thus, as illustrated, the fluid 66 within the hydraulic cylinder 67 is free to flow in the direction of the arrow 82 when the piston 63 is moved in an upward direction, corresponding in this instance, to upward movement of the generator 11. On the other hand, when the piston 63 is moved in a downward direction, corresponding to downward movement of the generator 11, the plate 72 is forced by the fluid beneath the piston 63 and by the bias of the spring 80 onto the surface of the piston 63. When the plate 72 is in contact with the surface of the piston 63, the hydraulic fluid 66 is essentially trapped under the piston 63 preventing its downward movement. To return the fluid to its original state and lower the generator 11, a plurality of holes (not shown) can be provided in the rings 69 through which the fluid can flow. The rate of flow through such holes is, of course, constant depending on the number and diameters of the holes. If a controllable rate of flow is desired, an external fluid return line (not shown) having a control valve therein and interconnecting the top and bottom of the cylinder can be provided.

The spring 80 serves in a dual capacity to normally bias the plate 72 into contact with the face of the piston 63, to require a particular fluid pressure to force open the flow path through hole 70, and, additionally, to rapidly close the flow path after the particular fluid pressure drops. This is of interest since, with respect to the operation described above with respect to FIG. 1, when the generator 11 is moved in an upward direction essentially no opposing forces are encountered, but after the upward limit of travel is reached, it begins to descend. If the flow path were not immediately closed, the flow path would not be closed until the downward fluid pressure became sufficiently great to bring the plate 72 into contact with piston 63. This may result in an instantaneous application of pressure to the dashpot assembly and the generator 11, after it has already begun its descending motion, which may create undesirable shock forces upon the generator and carriage.

It can be further seen that because the fluid flow path, as shown by arrows 82, is not direct, that some amount of resistance to upward movement of the piston 63 is presented. This resistance can be controlled by proper selection of the number and size of the holes 70, the diameter of the plate 72, and the spacing of the plate 72 from the piston 63. Thus, for example, by appropriate choice of holes and plate dimensions the upward force may be adjusted to prevent the piston 63 from undesirably contacting the top of the cylinder in which it is contained by resisting, to a limited extent, the upward forces of the generator 11.

Figure 3:
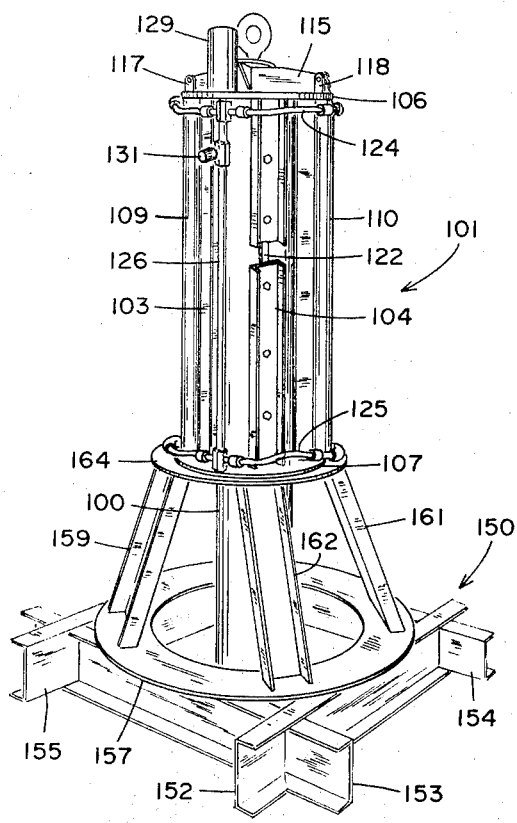
FIG. 3 is a perspective view of an alternative preferred embodiment of apparatus in accordance with the invention, used in combination with an elongated seismic energy generator in a quiescent or precombustion position.
Figure 4:
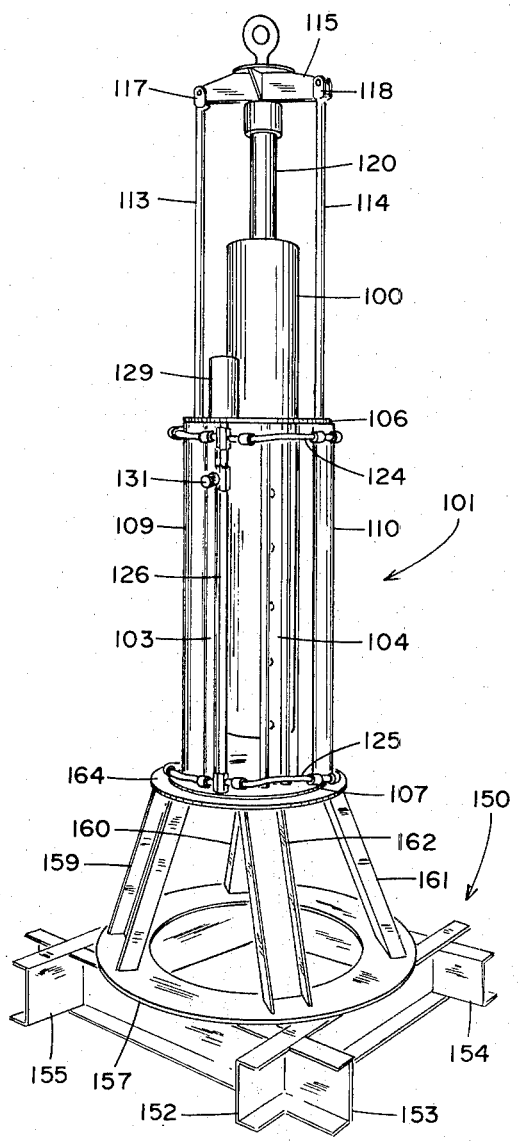
FIG. 4 is a perspective view of the holder of FIG. 3 in an expanded position after firing.

In many applications it is desirable to operate the generator 11 and its constraining frame directly on the ground or surface at which seismic waves are to be generated. The catcher 10, above described with reference to FIGS. 1 and 2, and in accordance with the principles of the invention, is adaptable to such use, with modifications, as shown in FIGS. 3 and 4. As therein shown, a seismic energy generator 100 can be operatively disposed within a frame assembly comprising the catcher 101. The catcher 101 is structurally similar to the apparatus of FIG. 1, but the members 17-20 of the frame 16 of FIG. 1 have been folded or lowered to encase or surround the seismic energy generator 100, presenting an apparatus initially containing the generator 100 rather than one into which it is thrust. Thus, the catcher 101 includes forward upstanding braces 103 and 104, as shown, and corresponding rear braces, not shown, all circumferentially disposed about the generator 100. The rear and forward braces 103 and 104 are interconnected at top and bottom by washer shaped plates 106 and 107, by welds, bolts, or the like, the generator 100 operating within the interior holes of the plates 106 and 107. Two hydraulic cylinders 109 and 110 are mounted with their cylinder or body portions between the plates 106 and 107, the piston rods 113 and 114, respectively (see FIG. 4), extendible through holes in the top plate 106. The piston rods 113 and 114 are connected by pins 117 and 118 to a yoke 115, which is bolted or otherwise attached to the piston rod 120 of the generator 100. The rearward and forward brace members 103 and 104 define the area within which the seismic energy generator 100 operates, and have runners or slides 122 (see FIG. 3) of bearing metal, such as brass or the like, or other material on their inner surfaces against which the generator 100 rides in operation. Thus, in operation, the generator 100 is constrained by the interior runners 122 strictly to up and down movement (and against undesired rotation, the impacting mass being, of course, free to axially rotate).

The interiors of the respective tops and bottoms of the hydraulic cylinders 109 and 110 are connected by tubes 124 and 125, which, in turn, are interconnected by a fluid flow line 126. The hydraulic fluid (not shown) within the hydraulic cylinders 109 and 110 is conducted thereby through the common flow tube 126, being conducted thereto by interconnecting fluid return lines 125 on the bottom and 124 on the top. Thus, as the pistons of the hydraulic cylinders 109 and 110 are moved up or down, the hydraulic fluid within the cylinders seeking to equalize the pressure on the tops and bottoms of the pistons flows out of the cylinder in which it is contained through the return lines 124 and 125 via the flow tube 126 to the opposite side of the piston within the respective cylinders. Since the volume of the hydraulic cylinders is changed by the insertion and withdrawal of the volume of the piston rod, such as piston rod 113 or 114, a hydraulic fluid reservoir 129 is provided communicating with the flow line of the network of lines 124, 125, and 126. The reservoir 129 includes within its chamber a multi-orifice fluid outlet (not shown) to prevent the hydraulic fluid forced into the chamber from emulsifying or bubbling with air also therewithin. The reservoir 129, alternatively, can be replaced with a hydraulic fluid accumulator to reduce this problem. Thus, as the hydraulic pistons are moved downwardly to the position shown in FIG. 3, more hydraulic fluid is displaced and is received in the hydraulic fluid reservoir 129. On the other hand when the piston rods 113 and 114 are withdrawn from the hydraulic cylinders 109 and 110, to the extended position shown in FIG. 4, the retained fluid in the reservoir 129 is injected into the network of lines 124, 125, and 126, to maintain the hydraulic fluid volume within the hydraulic cylinders 109 and 110.

To effect a unidirectional hydraulic cylinder resistance as described above with respect to the apparatus of FIGS. 1 and 2, a control valve 131 is included in the hydraulic flow line 126. The control valve 131 can be any of widely commercially available valves which permit fluid to pass therethrough without resistance in one direction, and presents resistance, controllable by check and needle valves, to fluid flow in another direction.

To facilitate operation on the ground, apparatus as described with respect to FIGS. 3 and 4 can be mounted on a test stand 150, which includes cross-base members 152-155, a support ring 157 and upstanding brace members 159-162. A second support ring 164 is also provided to which the plate 107 interconnecting the braces 103, 104, and so forth, is bolted.

Like the components of the apparatus of FIG. 1, above described, the various members of the frame 101 and the base 150 of the apparatus of FIGS. 3 and 4 are of strong material, such as channel iron or the like, rigidly fabricated to withstand the shocks imparted by the generator 100.

In operation, the frame assembly 101 is disposed on the ground at the point at which the seismic waves are to be generated. The generator 100 is at an initial position, shown in FIG. 3. The generator 100 is fired, its impacting mass strikes the ground, bounces, and then follows the piston and piston rod assembly, already moving in reaction to the explosion upwardly, resisted only by the fluid flowing in the holes 70 of the piston 63 in FIG. 2, to the extended position shown in FIG. 4. The control valve 131 then resists the fluid from beneath the pistons within the hydraulic cylinders 109 and 110 from returning to the tops thereof, and the seismic energy generator 100 is thence slowly lowered by virtue of its weight in overcoming the resistance of the fluid flowing through the control valve 131 to the original position of FIG. 3.

Figure 6:
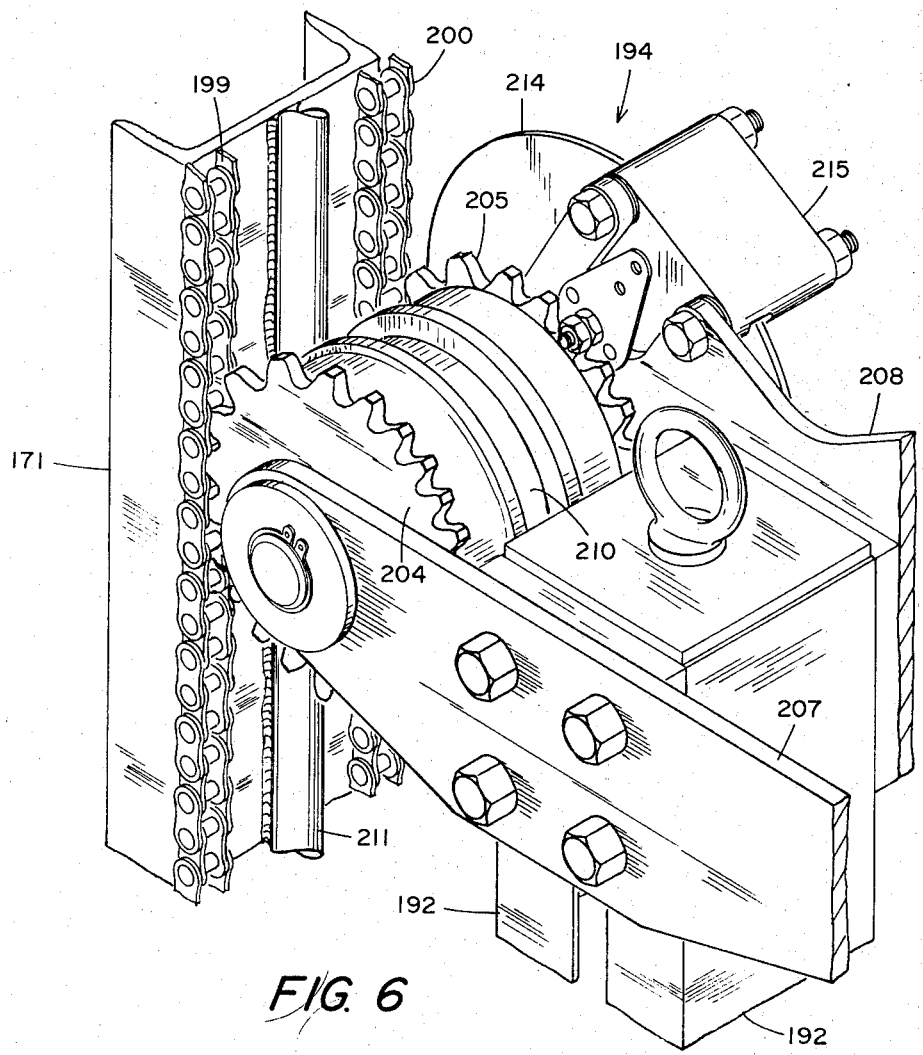
FIG. 6 is a perspective view of one of the brake assemblies of the apparatus of FIG. 5.
Figure 5:
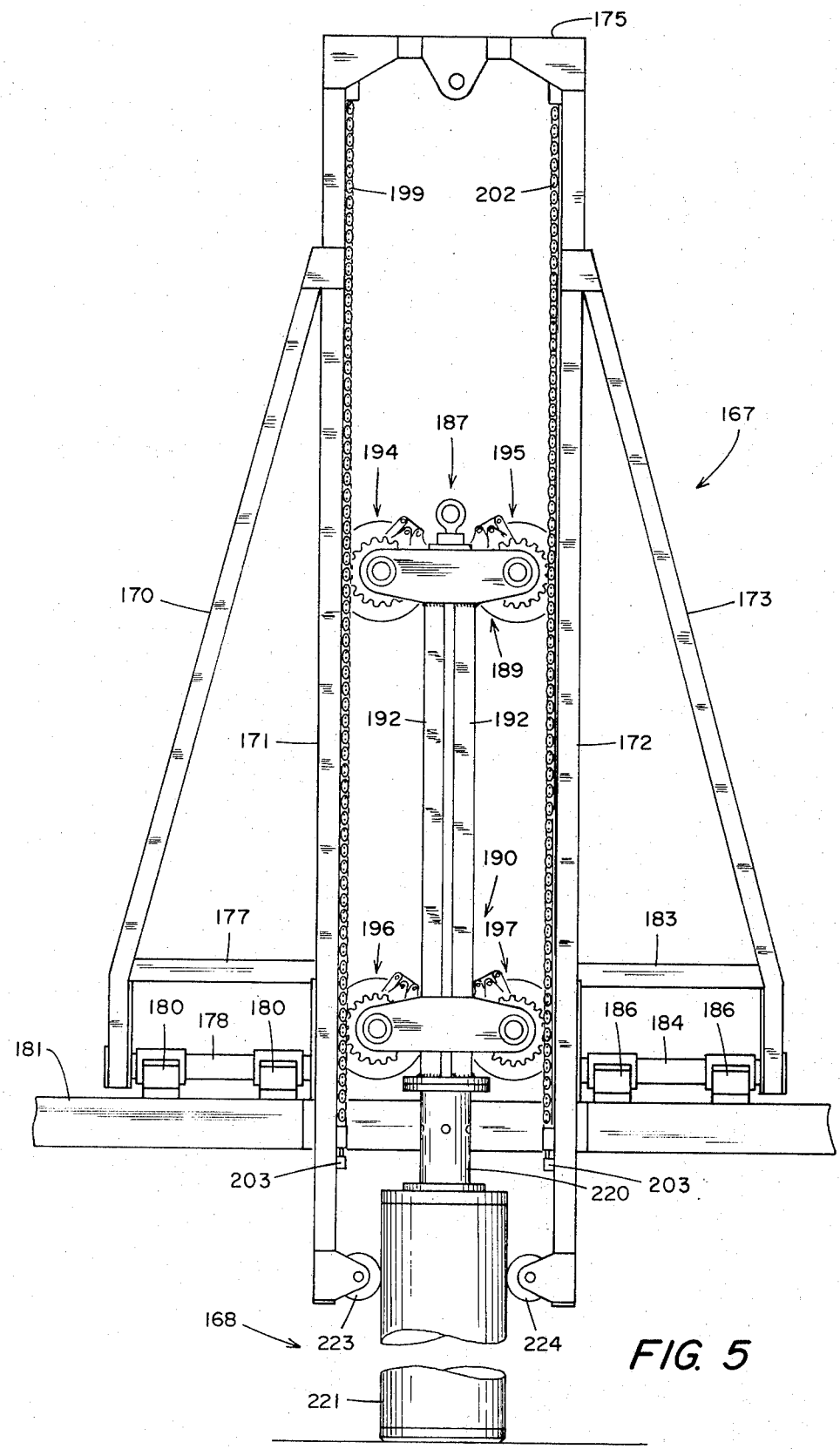
FIG. 5 is an elevational view of an alternative preferred embodiment of the apparatus, in accordance with the invention, utilizing mechanical unidirectional movement controlling means.

The invention, although described above with respect to a hydraulic dashpot configuration, may be equally advantageously practiced with a mechanical dashpot assembly, as shown in FIGS. 5 and 6. With reference to FIG. 5, a frame 167 carries a mechanically controlled carriage 187, which, in turn, carries a seismic energy generator 168. The frame 167 includes upstanding brace members 170–173, of channel iron or the like, braces 171 and 172 being essentially parallel, as shown, and interconnected at their tops by cross-brace 175; braces 170 and 171 being interconnected by cross-braces 177 and 178; and braces 172 and 173 being interconnected by cross-braces 183 and 184.

The cross-braces 178 and 184 are connected by hinge sets 180 and 186, respectively, to a platform 181, or bed of a vehicle, or the like, to facilitate positioning of the frame 167 and seismic energy generator 168 in an out-of-the-way position, similar to that above described with respect to the apparatus of FIG. 1.

A carriage 187, which includes two brake mechanisms 189 and 190, attached by bolts or the like (not shown) to the generator 168 to hold it in substantially an initial position illustrated, is carried by the frame 167.

The brake mechanisms 189 and 190 each include two brake assemblies 194 and 195, and 196 and 197, respectively, mutually disposed between the parallel braces 171 and 172, as shown, and each relating to an engagement means, such as the illustrated lengths of a respective pair of chains 199 and 202 strung adjacent the parallel braces 171 and 172 and put in tension by adjusting means 203. Thus, brake assemblies 194 and 196 engage chains 199 and 200 (chain 200 can be seen in FIG. 6), and brake assemblies 195 and 197 engage the lengths of the corresponding pair of chains 202 (the back chain not being shown).

The chains 199 and 200 and corresponding opposite chains 202 and its counterpart can be of the "bicycle chain" type, that is, they have a plurality of parallel tubular members interconnected at their ends by a plurality of "figure eight" shaped lengths, whereby the gears of the respective brake assemblies will engage the cylinders and be maintained thereby in position as below described in detail.

The details of the brake assembly 194 are particularly shown in FIG. 6. The brake assembly 194 includes two gears 204 and 205 carried between yoke members 207 and 208. The gears 204 and 205 are separated by a "V" groove guide pulley 210 which engages and is located by a guide rod 211 mounted onto the brace 171 which serves to control lateral and rotational movements of the brake assembly and the overall carriage 187.

A brake disc 214 and an air-hydraulic, hydraulic or mechanical adjustable friction drag unit 215 are carried on the yoke member 208 adjacent the gears 204 and 205 and the "V" groove guide pulley 210. The friction drag unit 215 can be any commercially available type, such as mechanical, hydraulic, air over hydraulic, or the like. Thus, if a mechanical drag unit is employed, it may be arranged to apply a preadjusted spring brake force to the disc brake 214. On the other hand, if a hydraulic or air-hydraulic drag unit is used, it may apply a variable force generated by air or hydraulic fluid, controlled, for example, by pressure within a bias chamber of the generator 11 or other suitable source. The brake disc 214 is connectable to the axle of the gears 204 and 205 and "V" guide pulley 210 by a mechanism for effecting connection upon rotation in a predetermined direction, such as a ratchet or sawtooth wheel and pawl arrangement (not shown). Other unidirectional coupling apparatuses can be employed in effecting the connection between the brake disc 214 and gears 204 and 205, such apparatuses being commercially available, are not described herein in further detail. Thus, for example, the inner driving sleeve of the brake may be coaxially carried on the inside of and rotatably carried upon the axle of the gears 204 and 205 and pulley 210 with the gear portion of the ratchet carried on the gear axle and the engaging pawl member or members carried on the outer driving sleeve, or vice versa. In operation, therefore, as the dashpot carriage 187 is moved upwardly the brake disc 214 is not connected, and the gears 204 and 205 are free to rotate, for example, counterclockwise. When, on the other hand, the dashpot carriage 187 is moved downwardly, the interconnecting ratchet assembly engages and the brake 214 is caused to rotate and resist the clockwise rotation of the gears 204 and 205.

The braking opposing rotation of the gear clutch assemblies 194–197 can be oppositely effected. For example, the brake discs of the brake assemblies 194 and 195 can be connected to present drag to downward carriage movement and disconnect in upward movement. On the other hand, the brake discs of the brake assemblies 196 and 197 can be connected to drag against upward carriage movement and disconnect in downward carriage movement.

The operation of the dashpot assembly of FIG. 5 is similar to that of FIG. 1 above described. When the generator 168 is fired, the piston rod assembly 220, followed by the impacting mass 221, recoil upwardly pushing the dashpot carriage 187 between the upstanding members 171 and 172. Because the gears of the respective gear brake assemblies 194–197 are free to rotate in directions corresponding to the upward and downward carriage assembly movements, a preadjusted resistance to upward movement is encountered. At the top of the travel (not shown) the selected gear brake assemblies, such as assemblies 194 and 195 engage to effect dynamic braking, allowing the carriage 187 to be slowly pulled downwardly by the weight of the generator 168 and the parts of the braces and members of the carriage 187, to the original position illustrated.

To assist in maintaining the alignment of the dashpot carriage 187 in its up and down travel, guide wheels 223 and 224 are provided upon the braces 171 and 172. Thus, if the generator 168 is inadvertently fired on an uneven or unlevel surface, or otherwise does not receive a square send-off impact, the respective gear brake assemblies will not be jammed or otherwise rendered inoperative.

In operation, because of the free upward movement and subsequent dashpot influences of the respective mechanisms above described, the apparatus functions essentially as a "catcher" device to enable the generator 168 to be fired and to recoil from the ground, but not to reimpact the ground before the useful energy pulse from the generator is appropriately processed.

The apparatus illustrated in FIG. 5 shows a mechanical dashpot assembly used in conjunction with an upright frame, mountable, by way of example, on a truck or other vehicle in a manner similar to the apparatus of FIG. 1. It should be pointed out, however, that by appropriate modification in the placement of the parts of the frame elements and gear brake assemblies, the mechanical dashpot assembly can be fabricated and used as a self-contained free standing unit, similar to the hydraulic unit above described with respect to FIGS. 3 and 4. It should be emphasized, additionally, that although the holder mechanism of the invention has been described with reference to an elongated seismic energy generator, the structure and principles of operation are equally applicable to other types of seismic energy generators, such as the commonly encountered large impacting plate type and others.

It should also be pointed out that although the invention has been described and illustrated with a certain degree of particularity, it is understood that the present disclosure has been made only by way of example and that numerous changes in the details of construction and the combination and arrangement of parts may be resorted without departing from the spirit and scope of the invention as hereinafter claimed.

What is claimed is:

1. Apparatus for carrying a seismic energy generator adapted to move in a vertical path comprising:
   a. a frame comprising a pair of upstanding braces extending along opposite sides of the seismic energy generator;
   b. a pair of upwardly extending hydraulic fluid cylinders adapted to control the movement between said frame and said seismic energy generator;
   c. a pair of pistons within said hydraulic cylinders;
   d. a pair of piston rods each in attachment at one of its ends with a respective one of said pistons, the other end of each of said pistons and said hydraulic cylinders being operatively interconnected between said frame and the seismic energy generator;
   e. a first yoke interconnecting said hydraulic cylinders and guiding carrying the seismic energy generator along said brace; and
   f. first two wheels rotatable carried by said first yoke;
   g. a second yoke spaced vertically from said first yoke and carried by said seismic energy generator; and
   h. second two wheels rotatable carried by said second yoke, said first and second two wheels riding upon respective ones of said two upstanding braces to guide movement of the seismic energy generator;
   i. means for affecting the resistance of said hydraulic cylinders to the movement of said seismic energy generator, whereby said hydraulic cylinder presents little resistance to upward movement of said seismic energy generator and a larger resistance to downward movement thereof.

2. The apparatus of claim 1 further comprising means for mounting said two upstanding braces onto a vehicle.

3. The apparatus of claim 1 wherein said frame comprises a plurality of upstanding braces surrounding the seismic energy generator, and further comprising a plurality of bearing members to guide movement of the seismic energy generator, each carried upon a respective one of said plurality of upstanding braces and against which the seismic energy generator rides.

4. The apparatus of claim 1 wherein said resistance affecting means comprises means for conducting hydraulic fluid between said hydraulic cylinders above said piston of each, means for conducting hydraulic fluid between said hydraulic cylinders below said piston of each, means connected between said above-piston and below-piston hydraulic fluid conducting means for conducting hydraulic fluid therebetween, and means within said interconnecting means for permitting hydraulic fluid to freely flow in one direction and for adjustably controlling the fluid flow rate in another direction.

5. The apparatus of claim 4 further comprising hydraulic fluid reservoir means communicating with said above-piston hydraulic fluid conducting means, whereby hydraulic fluid displaced by said piston rod is received in said hydraulic fluid reservoir.

6. The apparatus of claim 5 further comprising a platform on which said plurality of upstanding braces is carried to facilitate carrying the seismic energy generator above the surface to which seismic energy is to be imparted.

7. Apparatus for carrying a seismic energy generator adapted to move in a vertical path comprising:
   a. a pair of upstanding braces extending along opposite sides of the seismic energy generator;
   b. two engagement means co-extensive with said two upstanding braces and mounted thereon for receiving teeth of a gear;
   c. a mounting frame to which the seismic energy generator is attached disposed between said two upstanding braces;
   d. a plurality of gear assemblies, each including a gear rotatably carried by said mounting frame having teeth engaging said engagement means; and
   e. means attached to each of said gears for resisting rotation thereof in one direction.

8. The apparatus of claim 7 wherein said plurality of gear assemblies are four in number.

9. The apparatus of claim 7 wherein each of said rotation resisting means comprises a brake independently rotatably mounted on said mounting frame coaxially with said gear, a ratchet wheel and a pawl engageably attached between said gear and said brake whereby said brake operates to resist rotation of said gear upon downward movement of said seismic energy generator.

10. The apparatus of claim 9 wherein said gear is a sprocket wheel and said engagement means are a plurality of chains.

11. The apparatus of claim 7 wherein each of said rotation resisting means comprises a brake independently rotatably mounted on said mounting frame coaxially with said gear, and unidirectional engagement apparatus interconnecting said gear and said brake to transmit gear rotation in one direction to said brake to resist rotation in the one direction.

12. The apparatus of claim 11 wherein said gear is a sprocket wheel and said engagement means are a plurality of chains.

13. The apparatus of claim 7 further comprising means for mounting said frame on a vehicle.

* * * * *